3,374,878
ROLLER CONVEYOR SYSTEM
Andrew T. Kornylak, 400 Heaton St.,
Hamilton, Ohio 45011
Continuation-in-part of application Ser. No. 392,223,
Aug. 26, 1964. This application July 25, 1966, Ser.
No. 567,577
11 Claims. (Cl. 198—127)

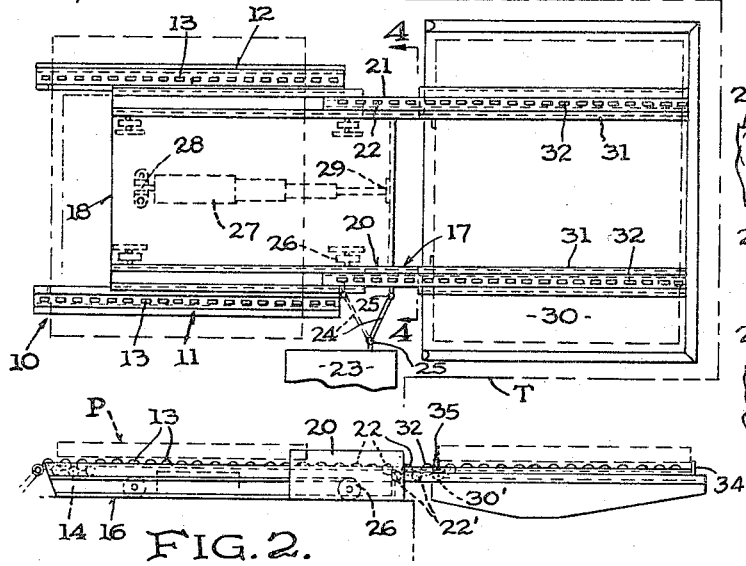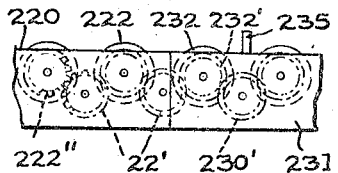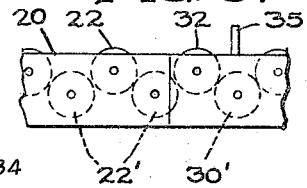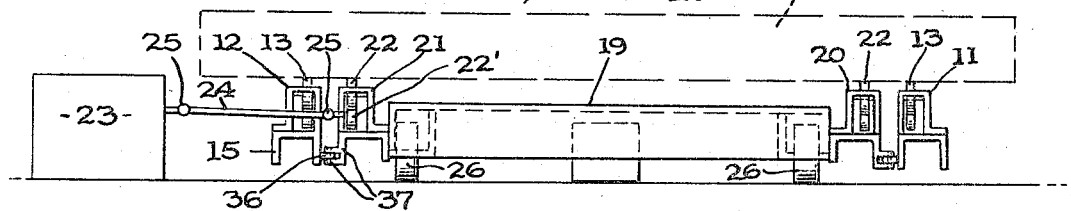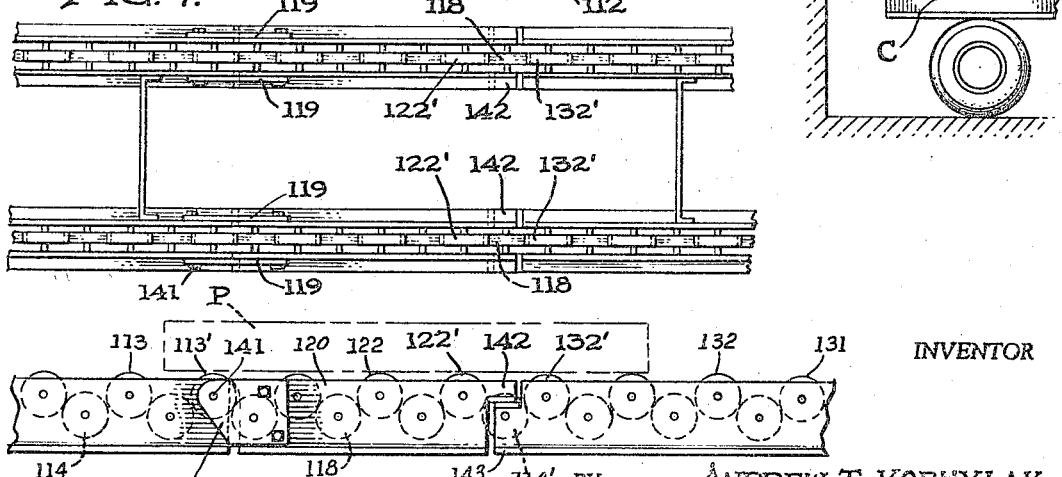

ABSTRACT OF THE DISCLOSURE

The disclosure herein relates to an arrangement wherein two substantially aligned conveyors, i.e., a dockside conveyor and one on board a vessel or other carrier, are separated from one another. A movable conveyor section is arranged to move between the two aligned conveyors to bridge the gap between them. The movable or bridge section conveyor and the fixed or dockside conveyor are provided with rollerways having rollers therein and power operated means for driving said rollers. Intermediate rollers, below and between the conveyor rollers frictionally engage the conveyor rollers to drive same, and at least one intermediate roller is connected to a source of power. When the bridge section conveyor is connected to the second conveyor, on the carrier, the drive of its rollers is transferred to the rollers of the second conveyor. One form of movable conveyor is hinged on the end of the first or fixed conveyor. In another form, a carriage moves longitudinally in the space between the conveyor rails and bridges the gap between the first and second conveyors.

---

This application is a continuation-in-part of my copending application S.N. 392,223, filed Aug. 26, 1964.

This invention relates to a roller conveyor system, and more particularly to a conveyor system comprising longitudinally spaced parallel aligned conveyors and a bridge section adapted to be moved into position to bridge the gap between the two longitudinally spaced conveyors, and to be moved away from the gap, when not needed or when the space between the two conveyors is used for other functions.

In loading or unloading railway cars, trucks, ships, barges, etc. roller or gravity conveyors are frequently used. Often there is a gap between the car, truck, etc., and the dockside conveyor. Conventionally a gang plank or similar device is used to bridge such gap for movement of hand trucks or dollies from the ship, car, etc. to the dock or pier. The device of this invention is adapted to enable the use of roller conveyors having power driven conveyor rollers, in lieu of gang planks for loading or unloading a freight carrier.

Throughout this specification the term "carrier" will be used to denote one of the means above noted for transporting goods or merchandise generally termed freight, and the term "dockside" will be used to represent a terminal dock platform or warehouse floor upon which freight is assembled for loading on a carrier or to which freight from a carrier may be delivered. Carriers of the type mentioned herein may have exit rollerways which facilitate movement of freight, and onto which freight may be deposited or from which freight may be removed by a fork lift device, or other suitable transfer means.

An object of this invention is the provision of a movable conveyor adapted to be moved into position between aligned spaced conveyors to bridge any gap existing between such conveyors as between a conveyor on a carrier and a dockside conveyor, during loading or unloading of a carrier.

Another object of this invention is the provision of a bridge section roller conveyor having rollerways with power driven conveyor rollers thereon and adapted to span a gap.

A further object of this invention is the provision of a conveyor system including a bridge section having rollerways with power driven conveyor rollers thereon and adapted to form a continuous connection between a dockside conveyor and a conveyor on a carrier.

Yet another object of this invention is the provision of means to transmit the drive from a power driven dockside conveyor to a bridge section, and, if needed, to an exit conveyor on a carrier.

Still another object of this invention is the provision of a conveyor system including bridge section roller conveyor having rollerways including power driven conveyor rollers thereon and including means to couple the drive thereof to the rollers on the rollerways of an exit conveyor on a carrier.

A still further object of this invention is the provision of a conveyor system including a roller conveyor bridge section, having parallel rollerways each having power driven conveyor rollers thereon, said bridge section being pivotally mounted at the end of a dockside conveyor.

An additional object of this invention is the provision of a conveyor system including a roller conveyor bridge section having rollerways including power driven rollers thereon wherein the bridge section is slidably mounted to bridge a gap between a dockside conveyor and an exit conveyor on a carrier.

The above and other objects will become apparent upon consideration of the subjoined specification taken with the accompanying drawings, which together form a complete disclosure of my invention.

In the drawings wherein like parts are represented by like characters of reference in the several views and wherein modifications are indicated by increasing the basic numeral by 100 for each case:

FIG. 1 is a plan view of one form of this invention;

FIG. 2 is an elevation;

FIG. 3 is a fragmentary elevation showing the means of coupling the drive of the bridge section;

FIGURE 3A is a modification of the drive shown in FIGURE 3;

FIG. 4 is an end view substantially on the line 4—4 of FIG. 1;

FIG. 5 is a general layout, in elevation, of a modified form of the invention;

FIG. 6 is an enlarged fragmentary elevation of a portion of the device of FIG. 5; and FIG. 7 is a plan view of the devices shown in FIGS. 5 and 6.

Referring now to FIGS. 1, 2, 3 and 4, 10 denotes a dockside conveyor having rollerways 11 and 12. Each rollerway 11, 12 has a plurality of rollers 13 and idler rollers 14. These rollers 13 and idler rollers 14 may respectively be the same as the rollers 46 and 59 of my copending application S.N. 398,146, filed Sept. 8, 1964, and may be powered in any suitable manner, such, for example as that shown by the rollers 44 and 68 of said prior application. As the means of applying torque to the rollers 14 is not a part of the present invention, further description is deemed unnecessary. In the copending application of Harry L. Lutes, assigned to the assignee of the present application, the conveyor rollers 22 are driven by either a roll or drum 30 or 38 or both.

The rollerways 11 and 12 are mounted on a suitable frame suitably mounted on the upper dockside surface or floor 16. The bridge section 17 includes a truck 18 having a deck 19, and a pair of short rollerways 20, 21 having rollers 22 interengaged with idler rollers 22'. The rollers 22 are preferably powered by means of a splined shaft 24 and universal joints 25 from a suitable fluid motor 23 to one of the rollers 22'. The means comprising the splined shaft 24 and universal joints 25 are diagrammatically represented in FIG. 1 in one position in dashed and another position in solid lines and the fluid motor being of conventional design is represented by the block diagram 23. Power is transmitted to other rollers 22 by idler rollers 22' and is passed from roller 22' to roller 22 and down to the next roller 22', and so on. The truck 18 is provided with floor engaging rollers 26, two being mounted at either end of the truck. The truck 18 is propelled and retracted to and from gap closing position by means of a conventional operating means for providing reciprocating motion such as the fluid motor 27, pivotally mounted on the floor as at 28 and connected at 29 to the forward end of the truck 18.

The exit conveyor in the carrier may be a tray 30 mounted on a suitable elevator in manner similar to the trays or carriers 113 of my prior application, supra. Such elevator may be mounted in a trunk on a ship, such as trunk T, shown in dashed lines on FIG. 1. There is provided on each tray 30 at least a pair of rollerways, which may be like the rollerways 128 of my application aforesaid. Each rollerway 31 has rollers 32, which may be like the rollers 13 above mentioned. Power is applied to the rollers 30 in a manner similar to that described in connection with the rollers 130 of my copending application, supra, as by the idler rollers 22' and 30'. Other means of providing power to these rollers may be used.

In operation, the tray 30 is stopped at the appropriate level, and the bridge section 17 is advanced to line the rollerways 20, 21 with the rollerways 31, by suitable operation of the motor 27. Idler rollers 22' at the forward end of the rollerways 20, 21, engage a roller 32 on the tray 30, and the power is carried by the chain of rollers 30', 32, as with the rollers 22, 22'. The pallet P on the dockside conveyor 10 is in position and retained by the manually operated stops 33. Upon removal of the forwardmost stops 33, the pallet will move forward being propelled by the rollers 13, 22 and 32 to bear against the stops 34. Stops 35 are set to prevent backward movement. The above operation of loading places the pallet in the position P'. For unloading the rotation of the rollers 32, 22 and 13 is reversed, and the stops 35 are removed to allow the pallet to move from the position P' to the position P. In this position the forwardmost stops 33 are positioned, and the rearmost stops 33 are removed to permit the pallet to continue its journey. The bridge section 17 and the truck 18 are guided in this reciprocating movement by means of rollers 36 mounted in brackets 37 and engaging the frame members 15 on which are rollerways 11 and 12 are mounted. Any other suitable guiding means may be provided. The construction is such that proper engagement is made up to one half inch up or down of the relative positions of the tray 30 and the bridge section 17.

A modification 117 of the bridge section is shown in FIGS. 4 and 5, which is pivotally mounted on a dockside section 110 and has means to engage a conveyor 140 on a carrier C. The dockside conveyor 110 comprises at least a pair of rollerways 112 as shown in FIGS. 4 and 5. The rollers 113 of the rollerway 112 are power driven by means of the idler rollers 114 which are in frictional contact therewith. Suitable means may be provided to apply torquet to one or more of the idler rollers 114, such as by means of the roller 115, suitably connected to a source of power by means of a chain or belt 116 and which may be similar to that shown in my copending application, supra. The bridge section 117 includes at least a pair of rollerways 120 as shown. The rollers 122 are like the rollers 113 and there are intermediate idler rollers 118 to frictionally drive the rollers 122. The rear end of the bridge rollerway is pivotally mounted by means of plates 119 attached to the end of the rollerways 120 on a pin 141 passing through the hub of the forwardmost roller 113' on the rollerway 112 so that this roller 113' becomes common to both the rollerway sections 112 and 120.

The upper portion 142 of the forward end of the rollerway 120 is extended forwardly slightly more than the lower portion thereof, and the lower portion 143 of the rollerway 131 is extended rearwardly slightly more than the upper portion, so that when the rollerways 120 and 131 are lined up for concomitant operation, the ends 142 and 143 are overlapped on one another in the manner of a halved-together joint. An idler driving roller 114' is mounted in the end 143, and frictionally engages the forwardmost roller 122' of rollerway 120 and the rearmost roller 132' of the series 132. Thus the roller 114' becomes common to the rollerway 120 and the rollerway 130 to transmit torque to the rollers 132.

With the above described modification, when the bridge section 117 is in place, and power is applied to the rollers 114, a pallet P will be propelled from the rollerway 112 to the rollerway 131 for loading into the carrier C. For unloading the rotation of the rollers 114 is reversed.

A modification of the drive shown in FIG. 3 is shown in FIG. 3A, wherein the like elements have the same numerals increased by 200. The rails 220 correspond to the rails 20 of FIG. 3, and the rails 231 correspond to the rails 31 of FIGS. 1 and 3. The means for driving the rollers 222 comprise gears 222'' connected to the rollers 222, and intermediate gears 222' below and between gears 222''. For driving the rollers 232, gears 232' are connected to the rollers 232 and intermediate gears 230' are below and between the gears 232'. The last gear 222' on the rail 220 transmits the drive to the first gear on the rail 231 when the two rails are coupled together in bridging relation. It is to be understood that this modified form of drive may be used in any and all variations of this invention.

Having described my invention in several aspects, I desire it to be understood that further modifications and changes may be made within the skill of the art and the scope of the appended claims.

I claim:
1. A conveyor system including a first conveyor, and a second conveyor longitudinally spaced therefrom, a bridge section conveyor bridging the gap between the first conveyor and the second conveyor and movable to and from bridging relationship, each of said conveyors and said bridge section comprising a pair of spaced parallel rollerways, longitudinally spaced power driven conveyor rollers on the rollerways of the first section and the bridge conveyor, longitudinally spaced conveyor rollers on the rollerways of the second conveyor, and means for coupling the power driven rollers of the bridge section to conveyor rollers of the second conveyor for driving the latter rollers.

2. The structure as defined in claim 1 wherein the means for driving said power driven conveyor rollers on said bridge section comprises idler rollers below and between adjacent pairs of conveyor rollers and frictionally engaging same, and means for rotating at least one of said idler rollers.

3. The structure as defined in claim 2 wherein the means for coupling the power driven rollers on the bridge section conveyor with the rollers on the second conveyor comprises an idler roller on one conveyor engaging a conveyor roller on the said conveyor and a conveyor roller on the other conveyor.

4. The structure as defined in claim 1 including idler rollers below and intermediate the conveyor rollers of said second conveyor.

5. The structure as defined in claim 4 wherein the means for coupling the conveyor rollers of the second conveyor with the driven conveyor rollers of the bridge section comprises an idler roller on one of said sections in engagement with a conveyor roller on said one section and a conveyor roller on the other section.

6. A conveyor system including a first conveyor, and a second conveyor longitudinally spaced therefrom, a bridge section conveyor bridging the gap between the first conveyor and the second conveyor and movable to and from bridging relationship, each of said conveyors and said bridge section comprising a pair of spaced parallel rollerways, longitudinally spaced power driven conveyor rollers on the rollerways of the first conveyor and the bridge section, longitudinally spaced conveyor rollers on the rollerways of the second conveyor, and means for coupling the power driven rollers of the bridge section to the conveyor rollers of the second conveyor for driving the latter rollers, the bridge section rollerways being pivoted on the ends of the rollerways of the first conveyor whereby the bridge section swings into and out of engagement with said second conveyor.

7. The structure as defined in claim 6 wherein the axis of the end roller of the first conveyor is the pivotal axis of the bridge section.

8. The structure as defined in claim 7 wherein the said end roller engages an idler roller on the first conveyor and an idler roller on the bridge section.

9. The structure as defined in claim 6 wherein the free end of the pivoted bridge section and the free end of the second conveyor are overlapped in a halved-together type joint when in operative position.

10. A conveyor system including a first conveyor, and a second conveyor longitudinally spaced therefrom, a bridge section conveyor bridging the gap between the first conveyor and the second conveyor and movable to and from bridging relationship, each of said conveyors and said bridge section comprising a pair of spaced parallel rollerways, longitudinally spaced power driven conveyor rollers on the rollerways of the first conveyor and the bridge section, longitudinally spaced conveyor rollers on the rollerways of the second conveyor, and means for coupling the power driven rollers of the bridge section to the conveyor rollers of the second conveyor for driving the latter rollers, the bridge section conveyor comprising a truck movable between the rollerways of the first conveyor, wheels supporting said truck for movement to and from bridging position, wheels on said bridge section conveyor engaging said first conveyor to maintain a constant spaced relation between the rollerways of said conveyors during movement.

11. The structure as defined in claim 10 including a power means and a flexible drive means connecting said power means and an idler roller of said bridge section.

References Cited

UNITED STATES PATENTS

| | | | |
|---|---|---|---|
| 1,556,438 | 10/1925 | Hanson | 198—20 |
| 3,115,975 | 12/1963 | Thompson | 214—44 |

RICHARD E. AEGERTER, *Primary Examiner.*

EVON C. BLUNK, *Examiner.*